Feb. 13, 1951     M. D. M. BARROSO     2,541,493
DEVICE FOR HOLDING EYEGLASSES
Filed Feb. 4, 1949
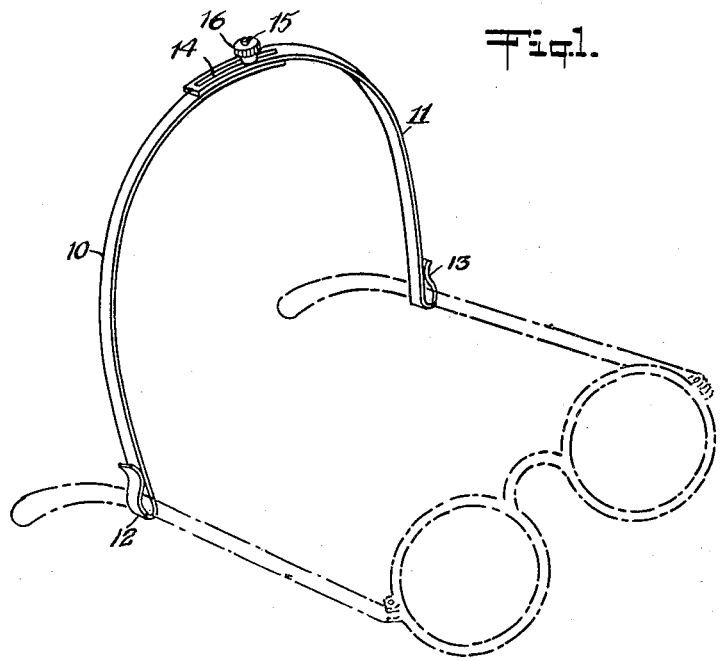
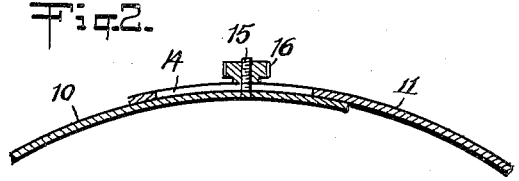
Inventor
Maria Dolores Mayol Barroso
By
Munn, Liddy & Glaccum
Attorneys Patented Feb. 13, 1951

2,541,493

UNITED STATES PATENT OFFICE 2,541,493

DEVICE FOR HOLDING EYEGLASSES

Maria Dolores Mayol Barroso, Vedado,
Habana, Cuba

Application February 4, 1949, Serial No. 74,542
In Cuba August 9, 1948

2 Claims. (Cl. 88—51)

This invention relates to a device which can be adjusted so as to be adapted to the head of the person using same, on which the bars of the eyeglasses may be supported, making it possible for the raising of same at will.

For a better understanding I shall refer in the description thereof, to the drawings hereto attached, in which the same parts are indicated by identical numbers.

Fig. 1 is a perspective view showing the device of the present invention in use.

Fig. 2 is an enlarged fragmentary sectional view.

The device is formed by two rims or rods 10 and 11 of solid and flexible material, the upper parts of which are shown arched and the lower ends of which are bent outwards and upwards so as to form hooks 12 and 13 respectively.

The arched upper end of part 11 has a longitudinal groove 14; and on the upper end of part 10 is a screw threaded pin 15 having a clamping nut 16. The pin extends upwardly through the groove 14, and the nut 16 exerts a clamping pressure holding the parts 10 and 11 adjusted as desired.

Both parts, formed by the rims or rods 10 and 11, being thus regulated, the device presents the form of an arch of slightly extended and bent ends outwardly forming hooks.

Said arch is placed on the head so that hooks 12 and 13, are situated on the sides so as to serve as a support to the temple bars of the eyeglasses used by the person, and with that end in view, said bars are hooked on the aforesaid hooks 12 and 13.

In order to more or less raise said hooks, and consequently the eyeglasses, the bars of which are thereon hooked, it shall suffice to slide pin 15 forwards or backwards on groove 14.

Pin 15 and groove 14 may be substituted by clasps on which the arched upper portions of the two rims or bars 10 and 11, may tightly slide.

My invention having been thus described, the patent by me applied for is for the protection of the following claims.

I claim:

1. A device for holding eyeglasses, constituted by two rims or bars of a solid but preferably flexible material, the upper portions of which are arched and the lower ends of which are bent outwardly and upwardly forming hooks; said upper portions overlapping each other and being provided with means for adjusting said rims or bars with respect to each other.

2. A device for holding eyeglasses, according to claim 1, wherein the means for adjusting the rims or bars consists of a longitudinal extended slot in the arched portion of one said rims or bars, a threaded pin provided on the upper part of the arched portion of the other rim or bar projecting upwardly through said slot, and a clamping nut on the pin.

MARIA DOLORES MAYOL BARROSO.

REFERENCES CITED

The following references are of record in the file of this patent:

UNITED STATES PATENTS

| Number | Name | Date |
|---|---|---|
| 624,369 | McLeron | May 2, 1899 |
| 836,087 | Callahan | Nov. 20, 1906 |
| 846,708 | Weaver | Mar. 12, 1907 |
| 1,370,806 | Garner | Mar. 8, 1921 |
| 1,605,725 | Herbert, Jr. | Nov. 2, 1926 |
| 1,619,738 | Daniels | Aug. 18, 1931 |
| 2,023,523 | Grimball | Dec. 10, 1935 |